United States Patent
Minato et al.

(10) Patent No.: US 8,342,208 B2
(45) Date of Patent: Jan. 1, 2013

(54) MULTI-PROTECTION VALVE

(75) Inventors: Ichirou Minato, Tokyo (JP); Kenji Hattori, Tokyo (JP); Fumiaki Uno, Fujisawa (JP); Hiroshi Ozawa, Fujisawa (JP)

(73) Assignees: Nabtesco Corporation, Tokyo (JP); Isuzu Motors Limited, Tokyo (JP)

( * ) Notice: Subject to any disclaimer, the term of this patent is extended or adjusted under 35 U.S.C. 154(b) by 651 days.

(21) Appl. No.: 12/516,418

(22) PCT Filed: Nov. 29, 2007

(86) PCT No.: PCT/JP2007/001327
§ 371 (c)(1),
(2), (4) Date: Jan. 6, 2010

(87) PCT Pub. No.: WO2008/068892
PCT Pub. Date: Jun. 12, 2008

(65) Prior Publication Data
US 2010/0139786 A1 Jun. 10, 2010

(30) Foreign Application Priority Data
Dec. 1, 2006 (JP) .................................. 2006-325414

(51) Int. Cl.
*F16K 11/20* (2006.01)
*B60T 13/00* (2006.01)
(52) U.S. Cl. ........................................ 137/885; 303/9.76
(58) Field of Classification Search .................. 137/885; 303/9.76, 118.1, 122.09, 127
See application file for complete search history.

(56) References Cited

U.S. PATENT DOCUMENTS

| | | | | |
|---|---|---|---|---|
| 3,982,792 A | * | 9/1976 | Nakajima | 303/9.61 |
| 4,159,854 A | * | 7/1979 | Peterson | 303/9.76 |
| 5,061,015 A | * | 10/1991 | Cramer et al. | 303/7 |
| 5,445,440 A | * | 8/1995 | Plantan | 303/7 |
| 5,458,403 A | * | 10/1995 | Moody | 303/7 |
| 6,276,761 B1 | * | 8/2001 | Beck | 303/9.61 |

FOREIGN PATENT DOCUMENTS

| JP | 2001-219844 A | 8/2001 |
|---|---|---|
| JP | 2006-168393 A | 6/2006 |

* cited by examiner

*Primary Examiner* — John Fox
(74) *Attorney, Agent, or Firm* — Law Offices of Peter H. Priest, PLLC

(57) ABSTRACT

An object of the present invention is to allow a vehicle to run in the case where an air compressor connected to an input port fails so as to cause air leakage from the location of the failure, by preventing air in a parking brake circuit from leaking from the failure location through a bleed air flow path. In order to achieve the object, a multi-protection valve includes: a communication passage for communicating between an input chamber and a service output port so as to bypass a pressure control valve provided in correspondence with the service output port, the communication passage having a check valve for preventing air from flowing from the service output port into the input chamber and a throttle for restricting the air flow rate; and a bleed air flow path for communicating between the input chamber and the parking output port so as to bypass pressure control valves, the bleed air flow path having a second check valve for preventing air from flowing from the input chamber to the parking output port. The multi-protection valve further includes a third check valve provided between the input chamber and an input port to prevent air from flowing from the input chamber to the input port.

1 Claim, 7 Drawing Sheets

MULTI-PROTECTION VALVE

TECHNICAL FIELD

The present invention relates to a 3-circuit or 4-circuit multi-protection valve for a vehicle, including an input chamber connected to a compressed air source via an input port, a service output port connected to a service brake circuit, a parking output port connected to a parking brake circuit, a plurality of pressure control valves provided in correspondence with the respective output ports to close as the pressures in the circuits connected to the respective output ports reduce, and a bleed air flow path for communicating between the input chamber and the parking output port.

BACKGROUND ART

Patent Document 1 discloses a multi-protection valve including an inlet port connected to a pneumatic device as a compressed air source, a parking brake circuit outlet port (referred to as "spring brake circuit outlet port" in Patent Document 1) connected to a parking brake circuit (referred to as "spring brake circuit" in Patent Document 1), and a connection passage connecting the inlet port and the parking brake circuit outlet port. The connection passage includes a check valve for preventing air from flowing from the inlet port into the parking brake circuit outlet port and a throttle for regulating the flow rate of exhaust air flowing in from the parking brake circuit through the parking brake circuit outlet port, the check valve and the throttle being disposed in series.

The connection passage allows air in the parking brake circuit to be discharged to the outside when air leakage occurs in a first main brake circuit or a second main brake circuit suffers to make the first main brake circuit or the second main brake circuit inoperable. When the air in the parking brake circuit is discharged to the outside, the parking brake cannot be disengaged, that is, the engagement of the parking brake can be maintained, which prevents unprepared starting of a vehicle during a period from engine start until the first main brake circuit or the second main brake circuit becomes operable. The configuration also prevents the residual air pressure in the parking brake circuit from exceeding the residual air pressure in the first main brake circuit or the second main brake circuit.

Patent Document 1: JP-A-Hei 10-100888

DISCLOSURE OF THE INVENTION

Problem to be Solved by the Invention

In the case where the pneumatic device connected to an upstream side of the inlet port fails so as to cause air leakage, however, air in the parking brake circuit may leak from the failure location through the connection passage. When the air pressure in the parking brake circuit becomes lower than the brake release air pressure for the parking brake provided downstream of the failure location, the parking brake may be engaged to make the vehicle unable to run.

The present invention has been made in view of the problem associated with the related art, and therefore has an object to provide a multi-protection valve that allows a vehicle to run in the case where a compressed air source connected to an input port fails so as to cause air leakage from the failure location by preventing air in a parking brake circuit from leaking from the failure location through a bleed air flow path.

Means for Solving the Problem

In order to achieve the foregoing object, the present invention provides a multi-protection valve including: an input chamber connected to a compressed air source via an input port; a service output port connected to a service brake circuit; a parking output port connected to a parking brake circuit; a plurality of pressure control valves provided in correspondence with the respective output ports to close as pressures in the circuits connected to the respective output ports reduce; a communication passage for communicating between the input chamber and the service output port so as to bypass the pressure control valve provided in correspondence with the service output port, the communication passage having therein a check valve for preventing air from flowing from the service output port into the input chamber and a throttle for restricting an air flow rate; and a bleed air flow path for communicating between the input chamber and the parking output port so as to bypass the pressure control valves, the bleed air flow path having a second check valve for preventing air from flowing from the input chamber into the parking output port, in which the multi-protection valve further includes a third check valve provided between the input chamber and the input port to prevent air from flowing from the input chamber into the input port.

According to the present invention, the third check valve is provided between the input chamber and the input port to prevent air from flowing from the input chamber into the input port, reliably preventing air from flowing in reverse from the air flow path through the input chamber toward the input port while permitting air to flow from the input port into the input chamber and then into the air flow path. Thus, when the compressed air source connected to the input port fails so as to cause air leakage, the third check valve prevents air in the parking brake circuit from flowing in reverse through the bleed air flow path out of the input port. Accordingly, it is possible to prevent air leakage from the failure location in the compressed air source, avoiding a situation in which the vehicle becomes unable to run.

Effect of the Invention

According to the present invention, the third check valve is provided between the input chamber and the input port to prevent air from flowing from the input chamber into the input port. Therefore, in the case where the compressed air source connected to the input port fails so as to cause air leakage from the location of the failure, air in the parking brake circuit is prevented from leaking from the failure location through the bleed air flow path. Thus, it is possible to avoid a situation in which the vehicle becomes unable to run due to air leakage from the failure location in the compressed air source, providing a multi-protection valve that is safer, easier to use and more stable in operation.

BEST MODE FOR CARRYING OUT THE INVENTION

Hereinafter, a description will be made of a preferred embodiment of a multi-protection valve according to the present invention. In the description below, an overview, the basic construction and the operating principle of a 4-circuit protection valve as an example of the multi-protection valve will first be described, and the structure and the operating mode of a check valve as a characteristic component of the multi-protection valve according to the present invention will then be described specifically.

FIG. 1 is a perspective view showing the appearance of a multi-protection valve according to the present invention. FIG. 2 is a front view showing the multi-protection valve according to the present invention. FIG. 3 is a bottom view of the multi-protection valve. FIG. 4 is a cross sectional view taken along the line A-A of FIG. 2. FIG. 5 is a cross sectional view taken along the line B-B of FIG. 3. FIG. 6 is a circuit diagram of the multi-protection valve. FIG. 7 shows the operating mode of a check valve provided close to and downstream of an input port, in which FIG. 7(a) is a side cross sectional view showing a case where air flows from the input port toward an air flow path and FIG. 7(b) is a side cross sectional view showing a case where air flows in reverse from the air flow path toward the input port.

First, a description is made of the schematic structure of a multi-protection valve 1 according to an embodiment of the present invention with reference to FIGS. 1 to 5.

The multi-protection valve 1 includes, provided in a valve body 3, a plurality of pressure control valves 25, 27, 67, 69, an input port 22, a plurality of output ports 47, 49, 83, 85, an air flow path connecting these elements, and so forth. The valve body 3 is a one-piece unit in a generally L-shape as viewed from a side, and includes a first body portion 9 and a second body portion 11 respectively extending in a first axial direction 5 and a second axial direction 7 perpendicular to each other, and a bent portion 13 connecting the first body portion 9 and the second body portion 11. The valve body 3 may be made of a metal material such as aluminum, a synthetic resin material such as a polyacetal (POM) or a nylon, or the like.

The pressure control valves 25, 27, 67, 69 are provided with covers 4A, 4B, 4C, 4D, respectively. Specifically, the first pressure control valve 25 to be discussed later is provided with the cover 4A, the second pressure control valve 27 to be discussed later is provided with the cover 4B, the third pressure control valve 67 to be discussed later is provided with the cover 4C, and the fourth pressure control valve 69 to be discussed later is provided with the cover 4D. An atmospheric pressure chamber 39 is formed in each of the covers 4A, 4B, 4C, 4D.

The first pressure control valve 25 includes a first valve element 101 which is movable and a first valve seat 31 against which the first valve element 101 is normally pressed by a coil spring 41 as an urging member. Likewise, the second pressure control valve 27 includes a second valve element 105 which is movable and a second valve seat 33 against which the second valve element 105 is normally pressed by a coil spring 41 as another urging member.

A detailed description is made of the circuit configuration of the multi-protection valve (hereinafter simply referred to as "valve") 1 according to the present invention with reference to FIG. 6.

In FIG. 6, reference numeral 15 denotes a compressed air source including an air compressor, 204 a first service brake circuit as a pressure circuit, 205 a second service brake circuit as a pressure circuit, 202 a parking brake circuit as a pressure circuit, and 220 an auxiliary equipment circuit as a pressure circuit. Reference numeral 206 denotes a parking brake device, which is engaged and disengaged by the parking brake circuit 202.

The compressed air source 15 is connected to the input port 22 of the valve 1. The first service brake circuit 204 is connected to the first service output port 47. The second service brake circuit 205 is connected to the second service output port 49. The parking brake circuit 202 is connected to the parking output port 83. The auxiliary equipment circuit 220 is connected to the auxiliary equipment output port 85.

An input chamber 21 is a space connected to the compressed air source 15 via the input port 22. The first pressure control valve 25 is provided in the flow path from the input chamber 21 to the first service output port 47. Likewise, the second pressure control valve 27 is provided in the flow path from the input chamber 21 to the second service output port 49. A first communication passage 56 is provided to communicate between the input chamber 21 and the first service output port 47 while bypassing the first pressure control valve 25. The first communication passage 56 is provided with a first check valve 1A for hindering air from flowing from the first service output port 47 to the input chamber 21, and a first throttle valve 1B for reducing the flow rate of air from the input chamber 21 toward the first service output port 47. Likewise, a second communication passage 58 is provided to communicate between the input chamber 21 and the second service output port 49 while bypassing the second pressure control valve 27. The second communication passage 58 is provided with a second check valve 2A for hindering air from flowing from the second service output port 49 to the input chamber 21, and a second throttle valve 2B for reducing the flow rate of air from the input chamber 21 toward the second service output port 49.

The third pressure control valve 67 is provided in the flow path from the input chamber 21 to the parking output port 83 in correspondence with the parking output port 83. Likewise, the fourth pressure control valve 69 is provided in the flow path from the input chamber 21 to the auxiliary equipment output port 85 in correspondence with the auxiliary equipment output port 85. A second input chamber 23 is provided at which the flow path from the input chamber 21 to the third pressure control valve 67 via the first pressure control valve 25 and the flow path from the input chamber 21 to the fourth pressure control valve 69 via the second pressure control valve 27 are merged. The flow path from the second input chamber 23 to the first service output port 47 is provided with a third check valve 51 for hindering a flow from the second input chamber 23 into the first service output port 47. The flow path from the second input chamber 23 to the second service output port 49 is provided with a fourth check valve 53 for hindering the flow to the second service output port 49.

In this embodiment, the flow path from the input chamber 21 to the third pressure control valve 67 passes via the first pressure control valve 25, and the flow path from the input chamber 21 to the fourth pressure control valve 69 passes via the second pressure control valve 27. However, the flow paths may be configured to extend directly from the input chamber 21 to the third pressure control valve 67 or the fourth pressure control valve 69 not via a pressure control valve.

The valve 1 is provided, as its characteristic component, with a bleed air flow path 203 for communicating between the input chamber 21 and the parking output port 83. The bleed air flow path 203 is provided with a second check valve 301 for hindering air from flowing from the input chamber 21 into the parking output port 83. The second check valve 301 may be of a known structure, in which a valve element is urged and pressed against a first annular valve seat 57 by a check valve spring 42 (see FIG. 5).

The bleed air flow path 203 allows air in the parking brake circuit 202 to be discharged to the outside when air leakage due to air failure occurs in the first service brake circuit 204 connected to the first service output port 47 or the second service brake circuit 205 connected to the second service output port 49 to make the first service brake circuit 204 or the second service brake circuit 205 inoperable.

A third check valve 201 is provided between the input chamber 21 and the input port 22 to prevent air from flowing from the input chamber 21 into the input port 22. The third check valve 201 prevents air from flowing in reverse from the parking output port 83 to the input port 22 through the bleed air flow path 203.

Specifically, the check valve 201 includes a valve seat member 208 which is disposed at the most upstream position and of which movement to the upstream side is regulated by a C-ring 207, a check valve element 210 disposed downstream of the valve seat member 208 and including a valve action projection 209 for contacting the valve seat member 208, and a check valve spring 211 disposed at the most downstream position to urge the check valve element 210 toward the valve seat member 208 (see FIGS. 4, 5 and 7).

The valve seat member 208 is a composite one-piece unit formed by molding a synthetic resin coating 213 around an annular metal core material 212. The check valve element 210 is a one-piece unit including a fitting shaft portion 214 fitted inside the check valve spring 211 and a cap-like outer cylindrical portion 215 provided around and separated from the fitting shaft portion 214 with a constant gap. The valve action projection 209 is formed in a ring shape along the periphery of an end face of the outer cylindrical portion 215. A plurality of guide ribs 216 are provided in parallel at regular intervals around the outer cylindrical portion 215 to be in sliding contact with the outer peripheral surface of the outer cylindrical portion 215.

The check valve spring 211 is a compression coil spring so sized as to be fitted outside the fitting shaft portion 214. The base end face of the check valve spring 211 contacts, and is supported by the bottom surface of a housing recess 217 for the check valve 201 formed at a location downstream of and close to the input port 22. A flow path 21a leading to the input chamber 21 is formed in the bottom surface of the housing recess 217.

Now, a description is made of the action of the valve 1 configured as described above.

When the compressed air source 15 is started with the air pressure in the pressure circuits and the valve 1 at zero, compressed air is supplied to the input chamber 21. When the pressure in the input chamber 21 increases to a predetermined pressure, the first pressure control valve 25 and the second pressure control valve 27 open to supply the compressed air to the first service brake circuit 204 and the second service brake circuit 205.

The first communication passage 56 and the second communication passage 58 act to open the first pressure control valve 25 and the second pressure control valve 27 at earlier timing. That is, the valve opening pressure of the first pressure control valve 25 and the second pressure control valve 27 is slightly lower when the pressure difference between the primary side (compressed air input side) and the secondary side (compressed air output side) is greater (for example in the state where compressed air is not supplied to the secondary side) than when the pressure difference is smaller (for example in the case where compressed air is already supplied to the secondary side), and the first communication passage 56 and the second communication passage 58 supply compressed air to the secondary sides of the first pressure control valve 25 and the second pressure control valve 27 in advance so as to open the first pressure control valve 25 and the second pressure control valve 27 at lower valve opening pressure and hence at earlier timing. The first throttle valve 1B and the second throttle valve 2B act to maintain the input chamber 21 at a predetermined pressure when the first service brake circuit 204 or the second service brake circuit 205 fails (which will be discussed in detail later).

When the first pressure control valve 25 and the second pressure control valve 27 open and the pressure on the secondary side of the valves reaches a predetermined pressure, the third check valve 51 and the fourth check valve 53 open to supply compressed air to the second input chamber 23. When the pressure in the second input chamber 23 reaches a predetermined pressure, the third pressure control valve 67 and the fourth pressure control valve 69 open to supply the compressed air to the parking brake circuit 202 and the auxiliary equipment circuit 220. As described above, the first pressure control valve 25 and the second pressure control valve 27 open earlier than the third pressure control valve 67 and the fourth pressure control valve 69 open so that the first service brake circuit 204 and the second service brake circuit 205 reach the lowest operable pressure before the parking brake circuit 202 and the auxiliary equipment circuit 220 reach the lowest operable pressure. Therefore, the vehicle can be started safely.

In the valve 1 configured as described above, when the first service brake circuit 204 fails and compressed air flows out with the vehicle parked (with the parking brake device 206 engaged), for example, the first pressure control valve 25 closes because the pressures on the secondary and primary sides reduce. The second pressure control valve 27 also closes because compressed air in the input chamber 21 flows out through the first communication passage 56 to reduce the pressure in the input chamber 21.

Compressed air in the parking brake circuit 202 flows from the parking output port 83 sequentially through the bleed air flow path 203, the input chamber 21 and the first communication passage 56 toward the first service output port 47. Consequently, the pressure in the parking brake circuit 202 becomes lower than the lowest operable pressure, which prohibits the parking brake device 206 from being disengaged. Accordingly, the third pressure control valve 67 is also closed.

Then, when the engine is started to drive the compressed air source 15, compressed air is supplied to the input chamber 21 again, and the pressure in the input chamber 21 increases to a predetermined pressure by the action of the first throttle valve 1B. The pressure on the secondary side of the first pressure control valve 25 has been reduced significantly, while compressed air remains on the secondary side of the second pressure control valve 27. Therefore, the second pressure control valve 27 opens at a valve opening pressure lower than the valve opening pressure of the first pressure control valve 25, which makes the second service brake circuit 205 operable. When the pressure in the second input chamber 23 increases thereafter to increase the pressure in the parking brake circuit 202 and the auxiliary equipment circuit 220 to be higher than the lowest operable pressure, both the pressure circuits become operable.

As described above, it is possible to prevent the inconvenience that the parking brake circuit 202 becomes releasable before the second service brake circuit 205 becomes operable when the first service brake circuit 204 fails.

The flow rate of compressed air that flows from the parking output port 83 sequentially through the bleed air flow path 203, the input chamber 21 and the first communication passage 56 and out of the first service output port 47 is adjusted by the first throttle valve 1B provided in the first communication passage 56. That is, the first throttle valve 1B, which is used in the normal state in which no failure occurs in any pressure circuit, is also used when an abnormality occurs. Therefore, it is not necessary to provide the bleed air flow path 203 with a throttle valve exclusively for use when an abnormality occurs, effectively reducing the component cost and the manufacturing cost of the valve 1.

When the compressed air source 15 connected to the input port 22 fails so as to cause air leakage, the third check valve 201 prevents air in the parking brake circuit 202 from flowing in reverse through the bleed air flow path 203 out of the input port 22. Accordingly, it is possible to prevent air leakage from the failure location in the compressed air source 15, avoiding a situation in which the vehicle is unable to run.

A description is made of the operating mode of the check valve 201 in the cases where (1) air flows in from the input port and (2) air flows in reverse toward the input port with reference to FIG. 7.

(1) In Case where Air Flows in from Input Port (See FIG. 7(a))

When air compressed by the compressed air source 15 is supplied to the input port 22, as shown in the drawing, the end face of the cap-like outer cylindrical portion 215 of the check valve element 210 is pressed to move the check valve element 210 toward the air passage against the urging force of the check valve spring 211. As the check valve element 210 moves, the valve action projection 209 of the check valve element 210 separates from the valve seat member 208 to form a gap between the check valve element 210 and the valve seat member 208, allowing air supplied to the input port 22 to reach the air flow path through the gap.

(2) In Case where Air Flows in Reverse Toward Input Port (See FIG. 7(b))

When the compressed air source 15 fails so as to cause air leakage, on the other hand, air in the parking brake circuit 202 flows in reverse toward the input port 22 through the bleed air flow path 203. In this case, the air flowing in reverse presses the back side of the check valve element 210 in conjunction with the urging force of the check valve spring 211 to move the check valve element 210 toward the input port 22. Then, the valve action projection 209 of the check valve element 210 contacts the valve seat member 208 into press contact with the valve seat member 208 to prevent air from flowing out of the bleed air flow path 203 into the input port 22. Thus, air leakage from the failure location in the compressed air source 15 is prevented, which allows the vehicle to run by allowing the parking brake device 206 to be disengaged.

While the multi-protection valve 1 according to the present invention is based on the configuration discussed above, it is a matter of course that partial modifications and omissions may be made without departing from the scope and spirit of the present invention.

INDUSTRIAL APPLICABILITY

The present invention is applicable to a 3-circuit or 4-circuit multi-protection valve for a vehicle, including an input chamber connected to a compressed air source via an input port, a service output port connected to a service brake circuit, a parking output port connected to a parking brake circuit, a plurality of pressure control valves provided in correspondence with the respective output ports to close as the pressures in the circuits connected to the respective output ports reduce, and a bleed air flow path for communicating between the input chamber and the parking output port.

BRIEF DESCRIPTION OF THE DRAWINGS

FIG. 7 shows the operating mode of a check valve provided close to and downstream of an input port, in which FIG. 7(a) is a side cross sectional view showing a case where air flows from the input port toward an air flow path and FIG. 7(b) is a side cross sectional view showing a case where air flows in reverse from the air flow path toward the input port.

Figure 1:
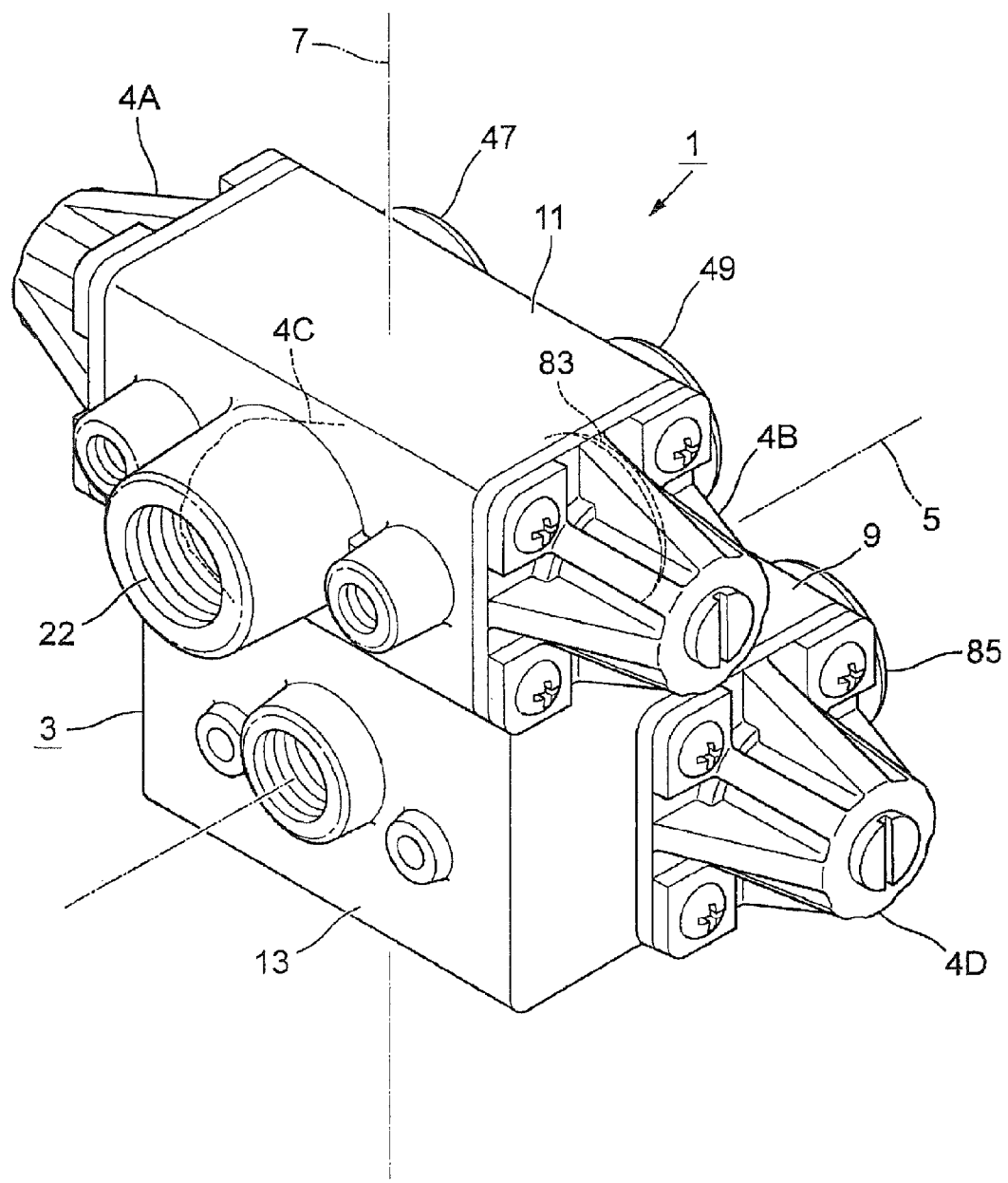
FIG. 1 is a perspective view showing the appearance of a multi-protection valve according to the present invention.
Figure 2:
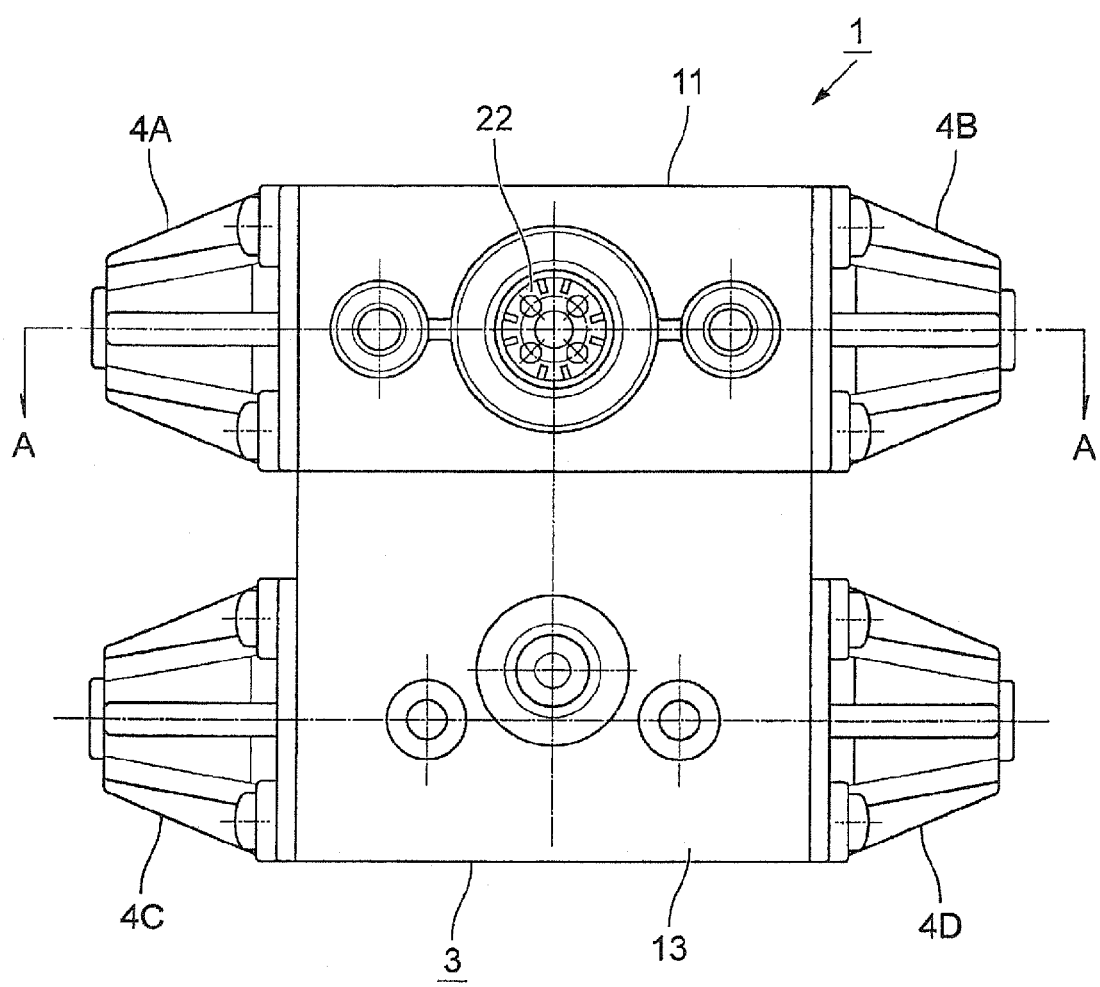
FIG. 2 is a front view showing the appearance of the multi-protection valve according to the present invention.
Figure 3:
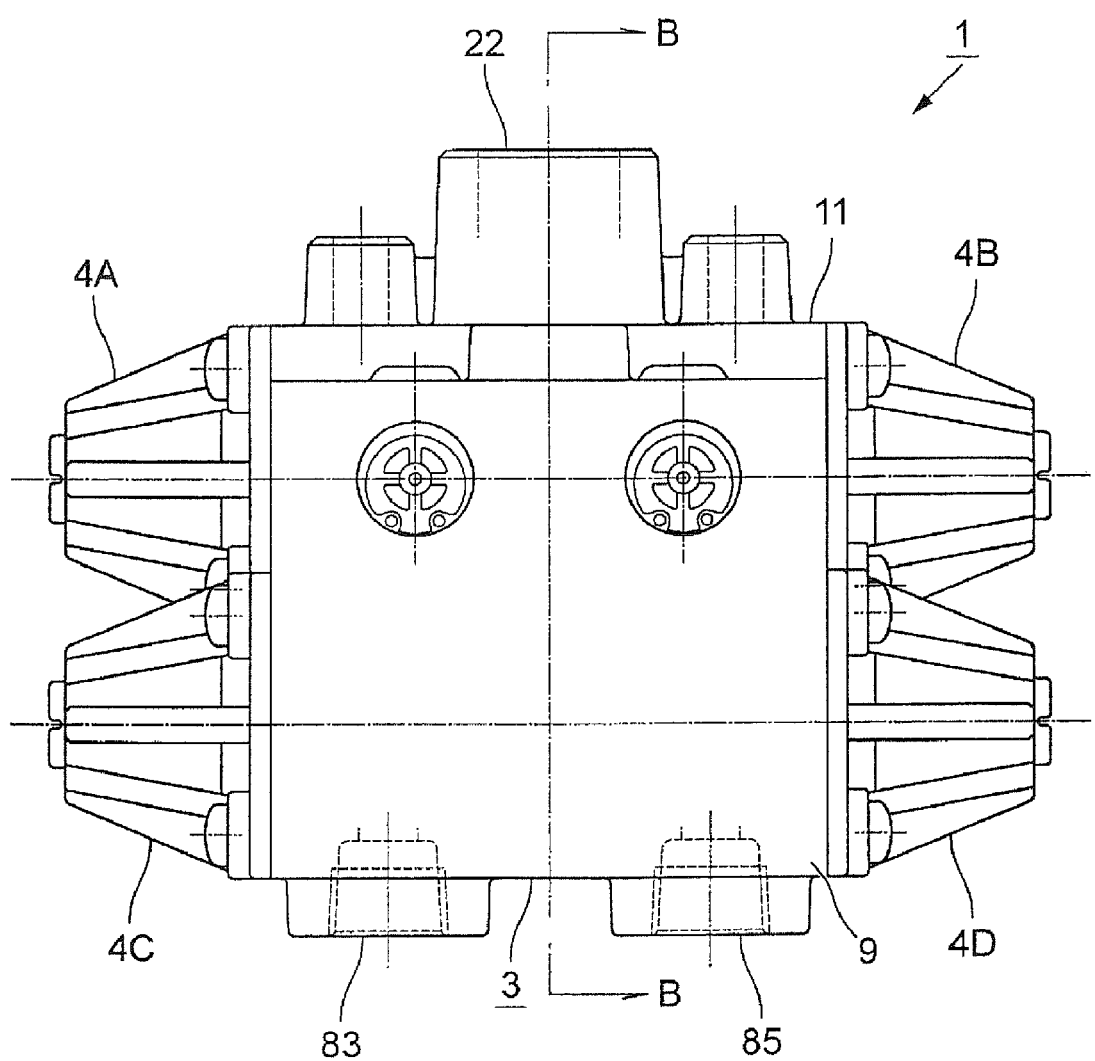
FIG. 3 is a bottom view showing the appearance of the multi-protection valve according to the present invention.
Figure 4:
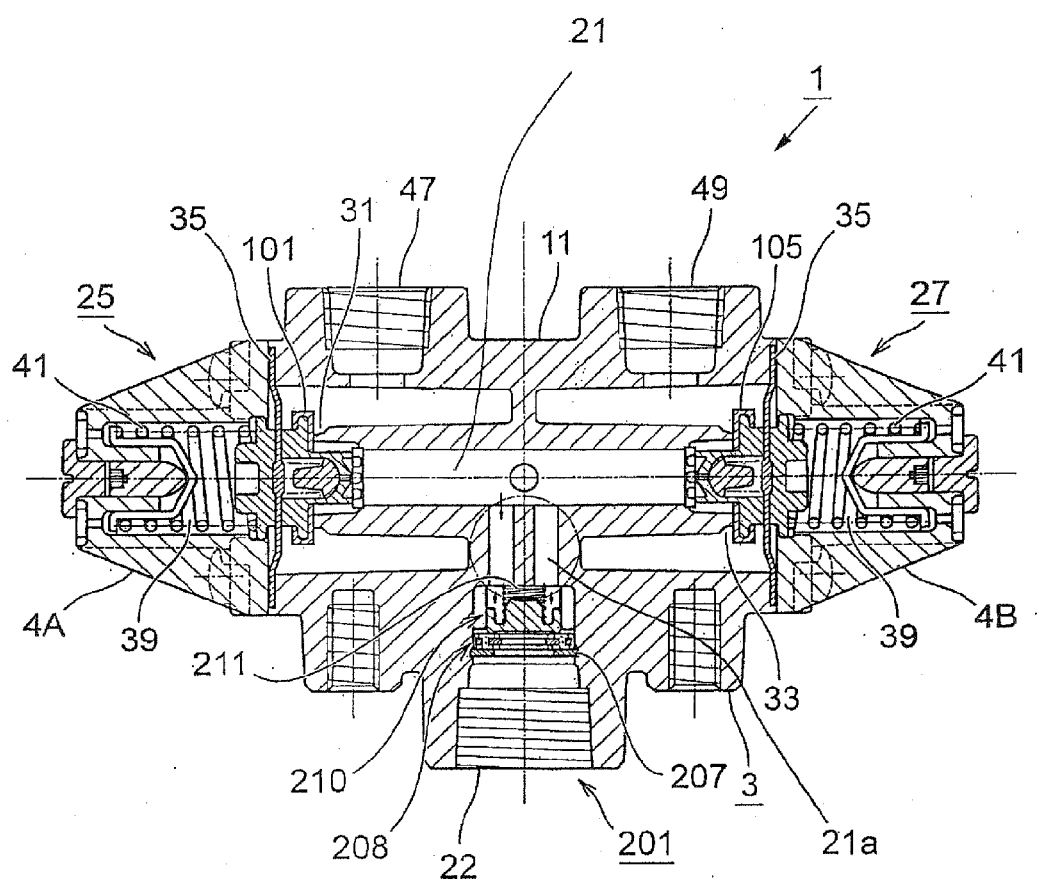
FIG. 4 is a cross sectional view taken along the line A-A of FIG. 2.
Figure 5:
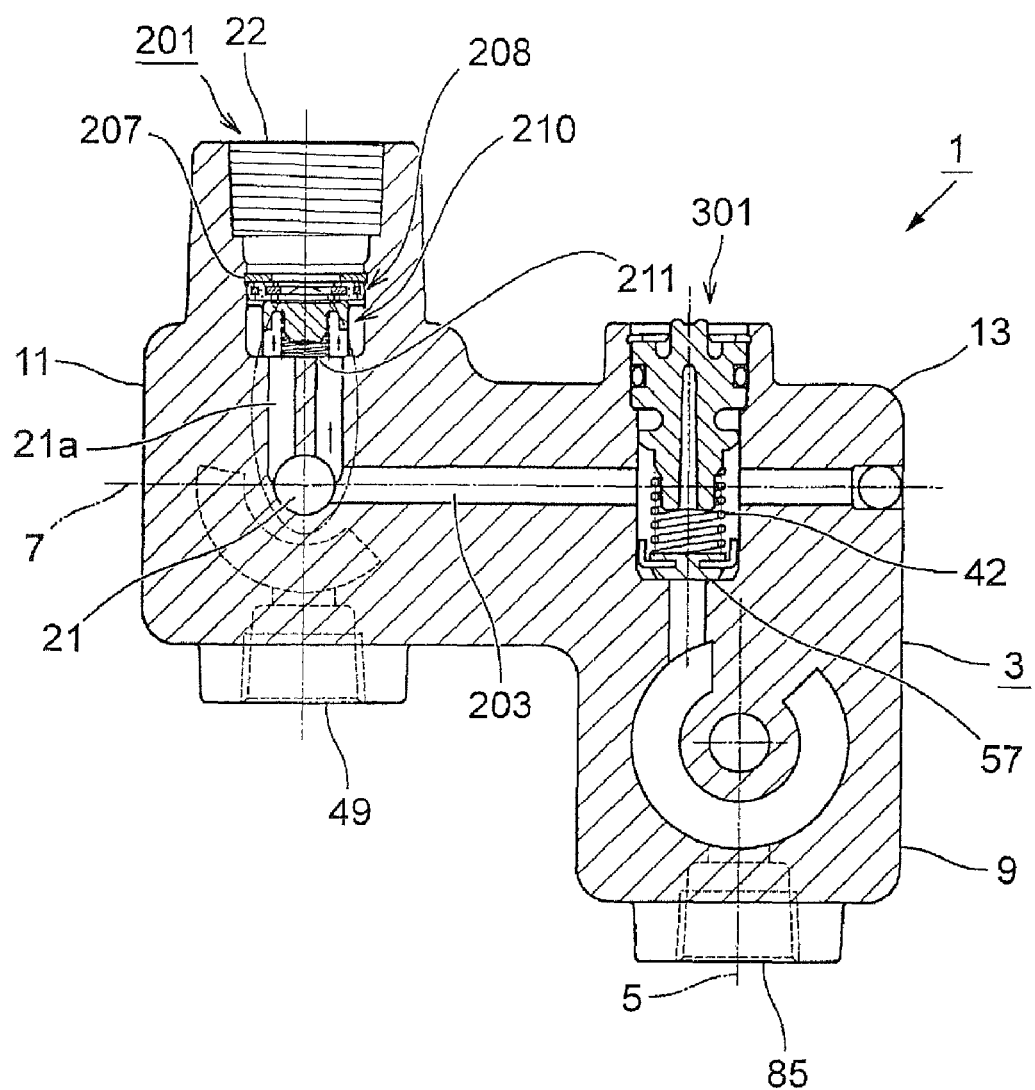
FIG. 5 is a cross sectional view taken along the line B-B of FIG. 3.
Figure 6:
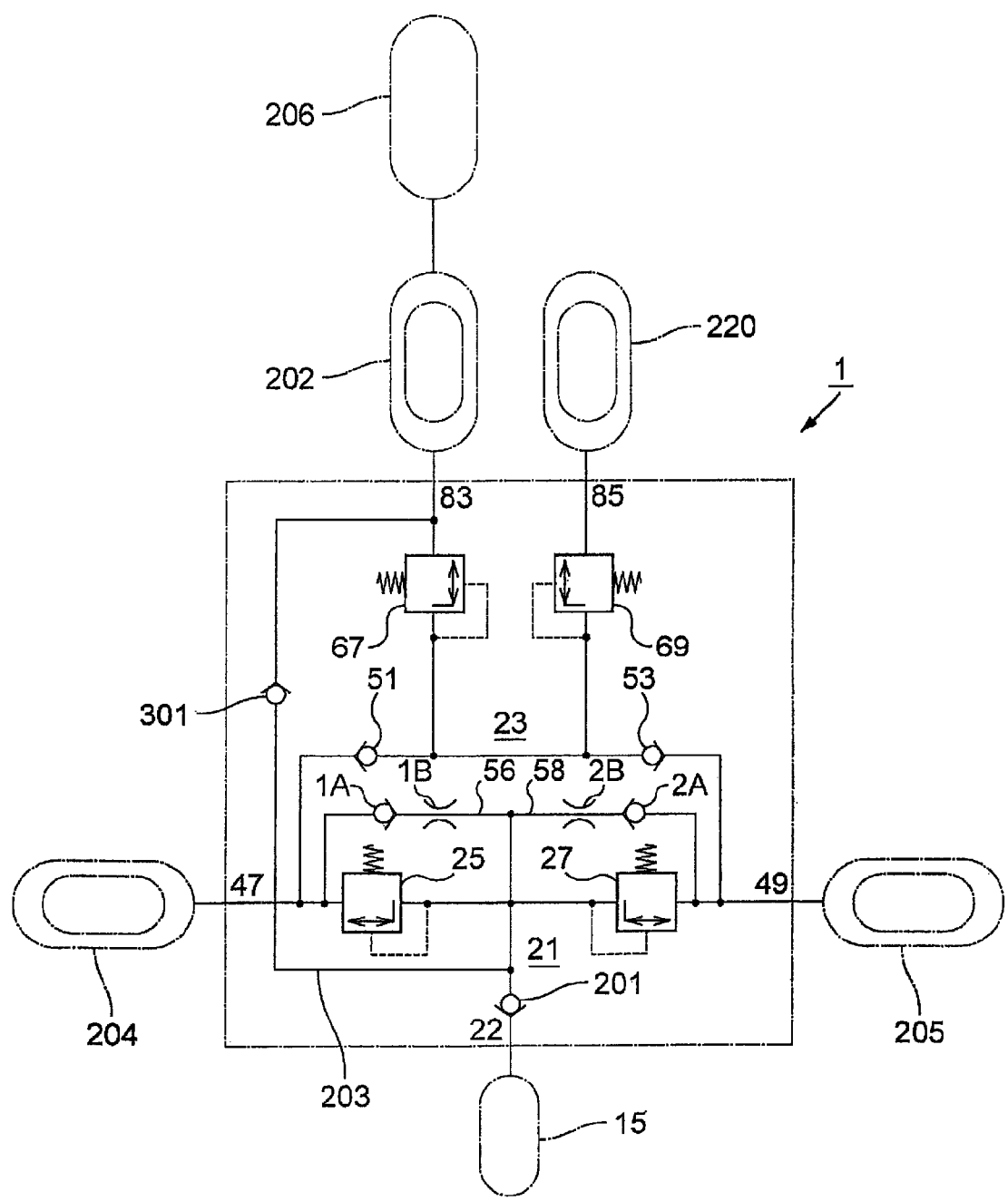
FIG. 6 is a circuit diagram of the multi-protection valve.
Figure 7:
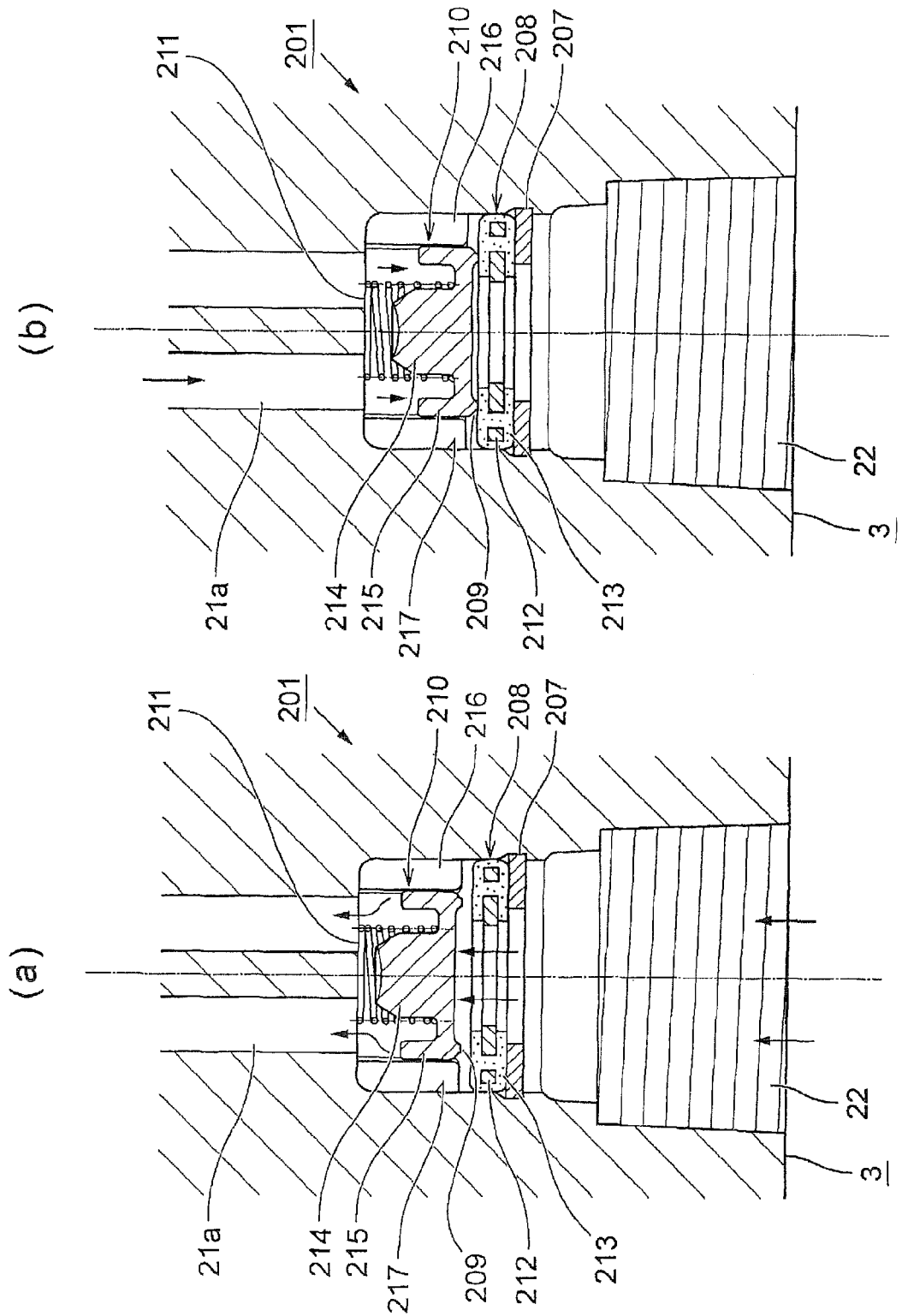

What is claimed is:

1. A multi-protection valve comprising:
   an input chamber connected to a compressed air source;
   first pressure control valves configured to close as a pressure in a service brake circuit reduces;
   second pressure control valves configured to close as a pressure in a parking brake circuit reduces;
   a flow path for communicating between the input chamber and the service brake circuit and the parking brake circuit such that air flows from the input chamber to the service brake circuit and the parking brake circuit, the flow path including all the first pressure control valves and all the second pressure control valves; and
   a bleed air flow path for communicating between the input chamber and the parking brake circuit so as to bypass the flow path, the bleed air flow path having a second check valve for preventing air from flowing from the input chamber to the parking brake circuit,
   wherein the multi-protection valve further comprises a third check valve provided between a location of communication between the bleed air flow path and the input chamber and the compressed air source to prevent air from flowing from the bleed air flow path to the compressed air source.

* * * * *